United States Patent [19]

Avsan

[11] 3,996,567
[45] Dec. 7, 1976

[54] APPARATUS FOR INDICATING ABNORMAL PROGRAM EXECUTION IN A PROCESS CONTROLLING COMPUTER OPERATING IN REAL TIME ON DIFFERENT PRIORITY LEVELS

[75] Inventor: Oleg Avsan, Huddinge, Sweden

[73] Assignee: Telefonaktiebolaget L M Ericsson, Stockholm, Sweden

[22] Filed: Apr. 16, 1975

[21] Appl. No.: 568,621

Related U.S. Application Data

[63] Continuation-in-part of Ser. No. 535,292, Dec. 23, 1974, which is a continuation of Ser. No. 355,417, April 30, 1973, abandoned.

[30] Foreign Application Priority Data

May 23, 1972 Sweden .................. 6661/72

[52] U.S. Cl. .......................................... 340/172.5
[51] Int. Cl.² .......................................... G06F 9/18
[58] Field of Search .................. 340/172.5

[56] References Cited
UNITED STATES PATENTS 3,723,975   3/1973   Kurtz et al. .................. 340/172.5
3,828,321   8/1974   Wilber et al. .................. 340/172.5

Primary Examiner—R. Stephen Dildine, Jr.
Attorney, Agent, or Firm—Hane, Baxley & Spiecens

[57] ABSTRACT

Apparatus for indicating an abnormal program execution by a process controlling computer in, for example, a telecommunication system wherein the different programs, each consisting of one or more program sectors, are called for and executed within certain so-called priority levels. Each priority level includes a counter for supervising the execution of the programs on the level. This counter is stepped, for example, in its forward direction by a clock for measuring the time during which the computer works on the associated priority level and if a certain time limit is exceeded, a warning signal is obtained. For supervising the work of a certain program sector a second counter is arranged which is stepped in either direction by means of the clock and if a certain time limit is exceeded an alarm signal is obtained. The warning and alarm signals are delivered to the central processing unit of the computer via a control register for initiating an instruction program corresponding to the alarm or warning signal, respectively.

3 Claims, 6 Drawing Figures

APPARATUS FOR INDICATING ABNORMAL PROGRAM EXECUTION IN A PROCESS CONTROLLING COMPUTER OPERATING IN REAL TIME ON DIFFERENT PRIORITY LEVELS

This application is a continuation-in-part of co-pending application Ser. No. 535,292 filed Dec. 23, 1974, which is a continuation of application Ser. No. 355,417 filed Apr. 30, 1973, and now abandoned.

The present invention relates to an arrangement for indicating abnormal program execution in a process controlling computer which can be included in a telecommunication system.

In such a system traffic execution takes place by calling for and executing different programs which decide what steps are to be taken in the system. The different programs are then called during so-called primary intervals, i.e., a time interval during which the programs will be executed periodically in dependence of their respective priority levels, with the programs having the highest priority level being called for and executed first. However, it may happen that all the programs will not be executed within the interval. Therefore it may be necessary at the end of the primary interval to interrupt the execution of a certain program which will then be called during a later primary interval, see e.g. the Swedish patent 330,455. The duration of the primary interval is determined by means of a counter under control of a clock oscillator in the central unit of the computer. When the counter has reached a certain count value, the end of the primary interval is indicated.

In an integrated computer controlled telecommunication system it is important that a complete control can be achieved even for abnormal events in the system. Such abnormal events may originate from occasional accumulation of traffic which will overload certain programs so that execution times will be extended, causing a time shift in the execution of the other programs, a so-called program swing. Such a swing can result in a reduced traffic execution capability which can be further deteriorated and, at the worst, may even lead to a complete stop in the program execution if preventative measures are not taken. An abnormal occurrence in the system can also originate from part of the software or hardware causing a total stop of the program execution.

The present invention, which is concerned with the above-mentioned problems, is based on the observation that when abnormal conditions are present in a store programmed telecommunication system, the usual times required for executing the programs on the different priority levels are extended. Hence, by measuring the time required for such executions it is possible to indicate if abnormal conditions are present or not in the system. The present invention enables the measurement of the absolute time for program execution by counter circuits which are stepped by the clock source which controls the primary intervals. The time measuring is thus carried out by stepping the counter circuits in dependence on a clock and not in dependence on a program where a time value is inscribed in the counting circuits by means of the computer program. It is also possible to obtain the state of the program execution at a stop by inhibiting the stepping of the other counters.

One object of the present invention is thus to indicate abnormal conditions in the program execution and to allow maximum use of the total available traffic capacity of the computer by eliminating an uncontrolled program swing. The occurrence of such a program swing in a computer controlled telecommunication system is caused by differences in time required in the system for calling and executing the different time limited programs.

Another object of the present invention is to give an automatic message when the control programs are to be called upon to correct the abnormalities of the system so immediate measures are to be taken to avoid a total stop in the computer.

The invention, the characteristics of which appear from the appended claims, will be more fully described with reference to the accompanying drawings, in which:

Figure 1:
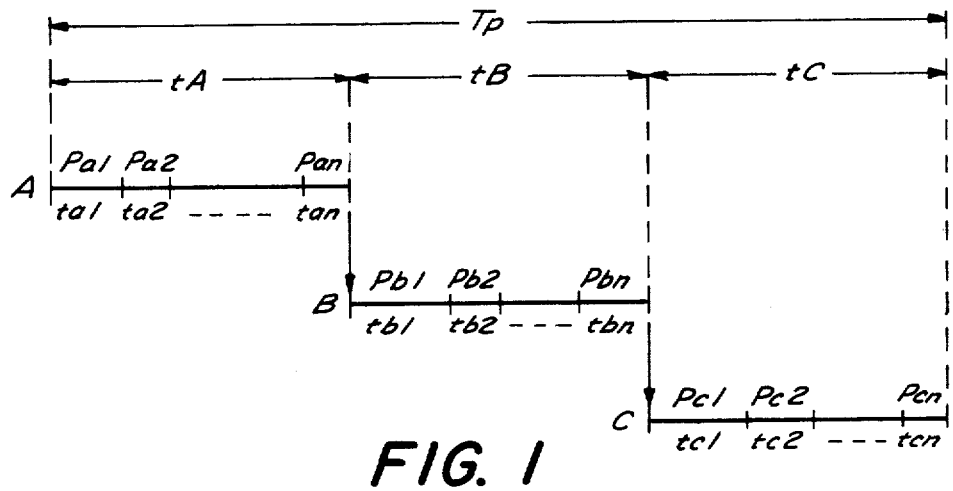
FIG. 1 shows a schematic timing diagram for a primary interval within which programs with different priority levels are executed.

FIG. 1 shows a schematic timing diagram for three different priority levels (program levels) within an arbitrarily chosen primary interval $T_p$, where each level is handled during the time intervals $tA$, $tB$ and $tC$. The processing of the different levels is started by reading prechosen binary digit values which are inscribed in a register and which are associated with each level as will be described in connection with FIG. 3. References $Pa1-Pan$, $Pb1-Pbn$, $Pc1-Pcn$ denote the different programs, which during the primary interval $Tp$ are called during their respective priority levels A, B and C and which are executed during the times $ta1-tan$, $tb1-tbn$ and $tc1-tcn$ respectively. In particular, the programs $Pa1-Pan$ have the highest priority and consequently these programs will be the first to be executed during the priority level A. The other programs $Pb1-Pbn$ will follow on the level B and the programs $Pc1-Pcn$ on the level C. FIG. 1 is intended to illustrate the conditions during normal program execution.

Figure 2:
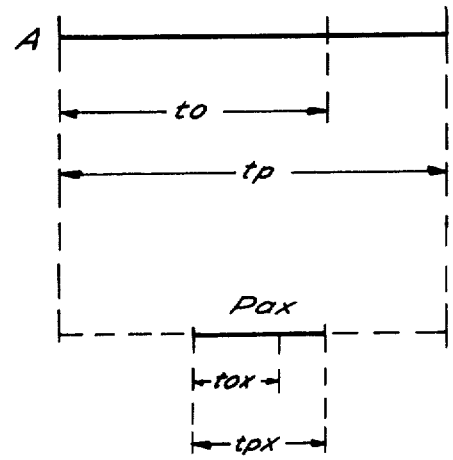
FIG. 2 shows schematically a timing diagram for a priority level within the primary interval as well as an arbitrary program sector in this interval.

It is important that the execution of the different programs takes place within the time prescribed for each program, in order to avoid the delay and eventual shifting of the following programs. According to the idea of the invention the time required for the treatment of all the programs on each priority level, as well as the time required for at least some programs on the level are measured, and certain time limits are stated, the exceeding of which implies that certain operations are to be performed. In FIG. 2 there is shown in more detail an example of these limits of an arbitrary priority level and of an arbitrary program sector within this level. The time $to$ of the priority level indicates a first time limit for which an indication (warning signal) about abnormal operation is to take place and the time $tp$ indicates a second time limit implying that a definite stop in the program execution is to be indicated (alarm ignal) so that immediate steps are to be taken. In a similar manner the times *tox* and *tpx* of an arbitrary program section P*ax* in the level define the times for abnormal operation and total stop, respectively, in the program execution. However, it is sufficient only to indicate the time *tox* for abnormal operation, as a total stop in the program execution in any case will be indicated by the level supervision, as will be explained in connection with the description of FIG. 3.

According to the idea of the invention, with each priority level A, B, C, there is associated a counter or a clock register for supervising the execution of the programs of the level, as well as one or more further counters associated with this level for supervising desired program sectors within the level.

Figure 3:
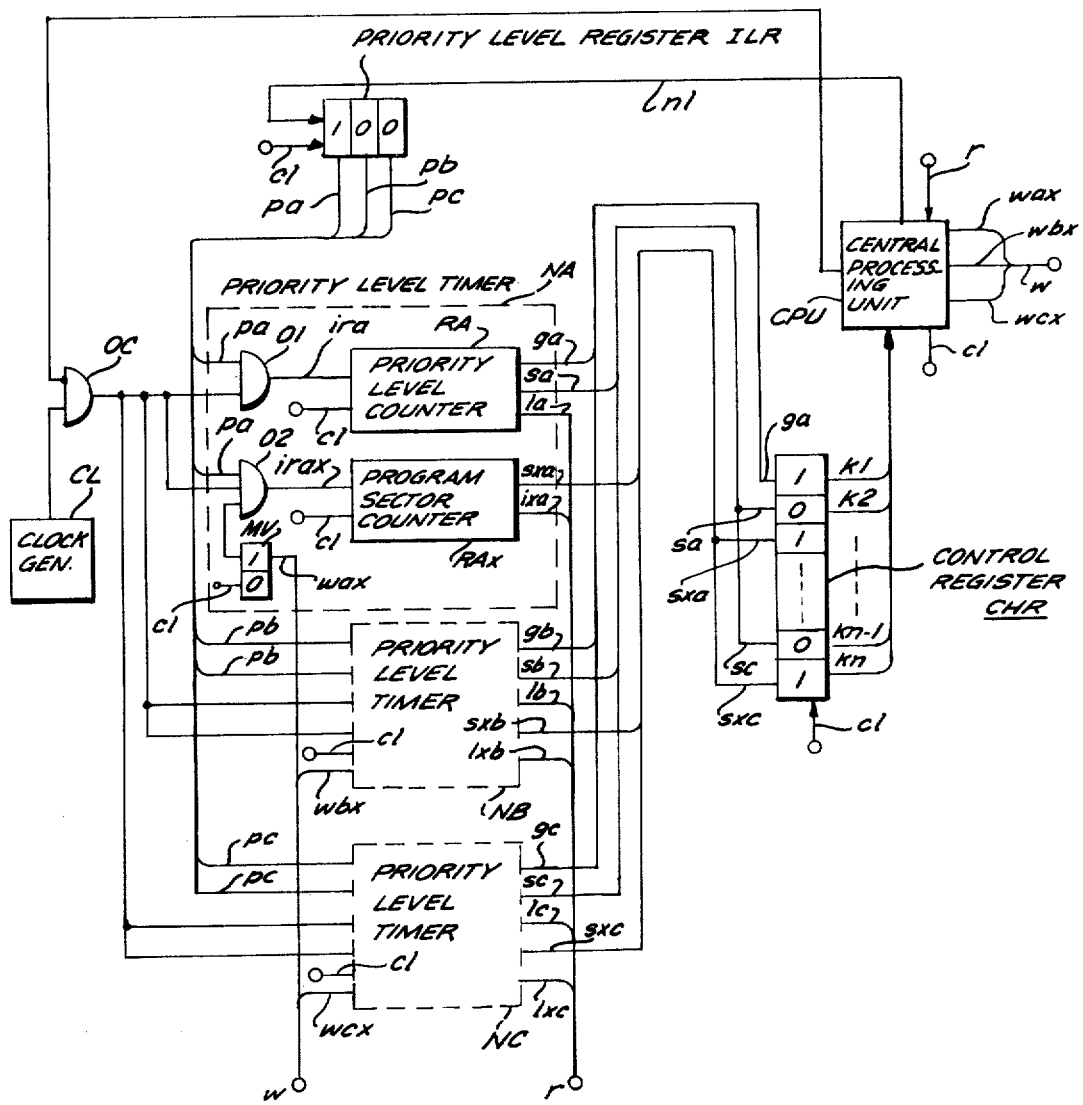
FIG. 3 shows a block diagram of an embodiment of the apparatus in accordance with the present invention.

The arrangement according to the invention will be more fully described with reference to FIG. 3 showing the apparatus in the form of a block diagram. In the figure references NA, NB, NC denote priority level timers, each being associated with a different one of the certain priority levels A, B, C. Only the timer NA is shown in detail. The timers NA and NO are constructed in a similar manner and differ only in the number of required counters as will hereinafter become apparent. The timer NA contains the priority level counter RA, intended to measure the time during which the computer works on priority level A and a second counter P*ax* intended to measure the time during which the computer executes a selected program sector P*ax* of level A (compare FIG. 2). Although there are *n* program sectors in priority level A only the counter for the program sector P*ax* is shown. It should be realized that there may be more such counters, one for each program sector to be monitored. The counters are stepped forward by clock pulses received at an incrementing input and their contents will be a measure of the time that has passed from the beginning of the program level A and the program sector P*ax*, respectively. When starting the work on the priority level A and the program sector P*ax*, respectively, the counters are stepped forward and if the execution time of the programs exceeds the intended values the stepping forward is continued to the counter positions from which a warning signal or an alarm signal, respectively, is obtained. Reference *ga* denotes a lead via which a warning signal is obtained when the counter RA reaches the position corresponding to the warning signal. Reference *sa* denotes a lead via which an alarm signal is obtained when the counter RA has reached the position corresponding to the alarm signal (Note the alarm signal occurs after the warning signal). Reference *sxa* denotes a wire via which an alarm signal is obtained when the counter RA*x* has reached the position corresponding to the alarm signal for the program P*ax*. Output leads *gb* and *sb* carry similar signals from counter RB of timer NB and output leads *gc* and *sc* carry the warning and alarm signals from the counter RC of timer NC. The counter RA is shown in greater detail in FIG. 4 which will be described hereinbelow. These output leads are connected to a control register CHR (hereinafter more fully described with respect to FIG. 5) in which one position is associated with each one of the leads originating from the timers NA–NC, these positions being "one" set upon obtaining a signal in order to give an indication via leads *k1*–*kn* to the central processing unit CPU that the instruction corresponding to the obtained warning or alarm signal is to be activated. All positions are "zero" set by a signal on line *cl* from the central processing unit CPU at the start of priority level A.

Reference ILR denotes a register (hereinafter more fully described) having a number of positions equal to the number of priority levels that are to be supervised. The register is stepped from position to position by pulses on line *nl* which are transmitted from central processing unit CPU at the start of each priority level. This register has three positions which, according to the example, corresponds to the levels A, B and C, respectively, and according to the invention is used for selecting the counters belonging to each priority level or program sector. When a one is in the position associated with the level A, a signal is fed via lead *pa* to one inlet each of two and-gates 01 and 02 will be alerted. This is the result of the fact that on level A the work has started and is a condition for counters to be stepped forward by means of clock pulses from a clock generator CL. The and-gate 01 now passes the clock pulses to the counter RA so that this counter is stepped forward all the time during work on level A. The and-gate 02 needs a further input condition to be fulfilled in order that the clock pulses will be able to step the counter RA*x* forward. This condition is that the program sector P*ax* being timed by this counter has been started, which is indicated when lead *wax* receives a signal from central processing unit CPU. As a result of this the flip-flop MV which was in the zero state as a result of a signal of line *cl* is changed to the one state. Thus the further input condition of the and-gate 02 is fulfilled so that the stepping forward of the counter RA*x* is initiated.

References 1 and 1*x*, respectively, denote a cable of lines by means of which the state of the counters can be read out in any moment quite independently of whether a counter has reached the position corresponding to the alarm condition or not.

Between the clock generator CL (of convention design) and one input of the and-gates 01, 02 of each one of the timers NA–NC it is preferable to connect an and-gate OC having an inverting inlet connected to the central processing unit CPU. Thus at a possible stop in the data processing, depending on an alarm signal from the counters, the central processing unit can transmit a signal to this inverting inlet, whereby the clock signals to the counters are interrupted. Thus the stepping forward of these counters is inhibited and their state at the moment of the alarm can be read out via the reading line *r*.

Figure 4:
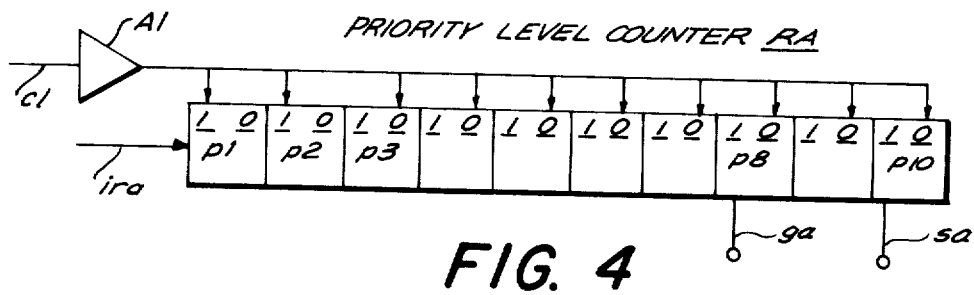
FIG. 4 shows schematically a typical counter used in the apparatus of FIG. 3.

Priority level counter RA shown in FIG. 4 can be a conventional multiposition up counter which is preset to a desired initial count by a pulse from amplifier A1 in response to a pulse on line *cl* at the start of priority level A. The output of amplifier A1 is selectively connected to the "set-to-one" inputs of positions *p1* and *p2* and the "set-to-zero" inputs of the remaining positions, by way of example. Thus the counter will be preset to a count of three each time a pulse is received on line *cl* from the central processing unit CPU. The lead *ga* is connected to the one output of position *p8* and the lead *sa* is connected to the one output of position *p10*. Accordingly, when the counter holds the number 128 which occurs 125 clock pulses after the start of priority level A a signal will be present on lead *ga*. Similarly, a signal will be present on lead *sa* after the counter has counted 253 clock pulses. It should be realized that the number of counter positions and the count numbers selected for generating the signals on leads *ga* and *sa* are merely exemplary. It should also be noted that the counter RAx is the same as counter RA except that counter RA cannot have less positions than counter RAx. Note instead of using up counters one could use presettable down counters which give signals when counting down reaches zero.

Figure 5:
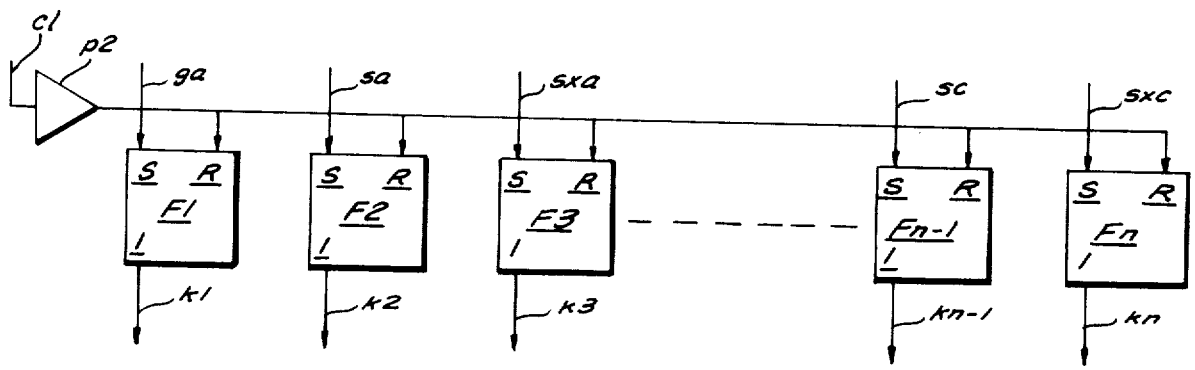
FIG. 5 shows schematically the control register CHR of FIG. 3.
Figure 6:
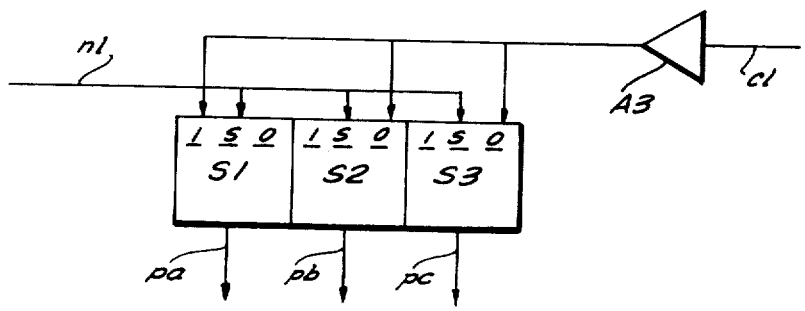
FIG. 6 shows schematically the priority level register ILR of FIG. 3.

The control register CHR is shown in FIG. 5 by way of example as a register comprising an array of set/reset flip-flops F1–Fn. Each flip-flop is set to zero at the start of priority level A when a pulse on lead cl from central processing unit CPU is fed by amplifier A2 to the reset input of each of the flip-flops F1 to Fn. The respective flip-flops are thereafter set by the outputs of counters within the priority level timers as described above.

The priority level register ILR is shown by way of example as a three stage shift register wherein each stage receives a shift pulse at its shift pulse input from lead $n1$ connected to central processing unit CPU at the start of each of the priority levels A, B, C. In addition, the "set-to-one" input of the first stage S1 and the "set-to-zero" inputs of stages S2 and S3 are connected via amplifier A3 to lead cl which receives a pulse only at the start of priority level A. Thus during priority level A a one is stored in stage S1 which emits a signal of lead $pa$. The pulse on lead $nl$ at the start of priority level B shifts the one to stage S2 causing the lead $pB$ to go high and the lead $pA$ to a low. At the occurrence of the pulse on lead $nl$ at the start of priority level C the one in stage S2 is shifted to stage S3 and lead $pC$ goes high while lead $pA$ reverts to a low. It should be noted that the register would have as many stages as there are priority levels which are monitored. In the present example there are only three such priority levels. Hence, there are only three stages to the shift register. It should also be noted that the register need not be shift register but can be a flip-flop register like register CHR whose positions are directly by a multiplicity of individual leads from central processing unit CPU.

The central processing unit CPU which forms no part of the invention can take many embodiments. However, it should be operating on a priority level basis, and via a terminal of its I/O channel it should emit a pulse onto lead cl at the start of priority level A(the highest priority level). In addition, via another terminal of the I/O channel it should emit a pulse onto lead $nl$ at the start of each priority level. Furthermore, it should emit pulses onto leads $wax$, $wbx$, etc. when the associated program sectors are to be performed. Finally, it should have an I/O buffer whose stages are connected in parallel to leads $k1$ to $kn$ to receive the information stored in control register CHR. A specific central processing unit can be found in the pamphlet "The Transit Exchange System AKE 13", Reprint from the "Ericsson Review", 1973, No. 2, pp. 13–14.

It should be apparent that in accordance with the invention it is possible to monitor the time for executing any program in any program sector.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. Apparatus for use with a process controlling computer having a central processing unit and operating in real time on different priority levels which consist of a number of program sectors to indicate to such computer that it is spending greater than a predetermined time at least on one of the priority levels, said apparatus comprising:
   a first multiposition register means wherein each position is assigned to a different one of the priority levels, said register means being adapted to receive signals from the central processing unit for establishing predetermined states in the positions to indicate which priority level is operative in the central processing unit,
   a clock pulse means for generating clock pulses,
   a plurality of first pulse counters, each of said first pulse counters being associated with a different one of the priority levels and having at least one output for emitting a signal when the accumulated pulse count reaches a predetermined value,
   logic means for connecting said clock pulse means and said first multiposition register means to said plurality of first pulse counters so that each of said first pulse counters counts clock pulses during its associated priority level,
   a multiposition control register means wherein each position is associated with a different priority level, said multiposition control register means being adapted to emit indicator signals to the central processing unit in accordance with which ones of its positions are in a particular state, each of said positions having an input for receiving a signal and in response thereto assuming said particular state,
   and connecting means for connecting the outputs of each of said first pulse counters associated with the different priority levels to the positions of said control register means associated with the corresponding priority levels.

2. The apparatus of claim 1 further comprising a second multiposition register means wherein each position is assigned to a different one of the program sectors of the priority levels, said second register means being adapted to receive signals from the central processing unit for establishing predetermined states in the positions thereof to indicate which program sector of which priority level is operative in the central processing unit, a plurality of second pulse counters, each of said second pulse counters being associated with a different one of the program sectors and having at least one output for emitting a signal when the accumulated pulse count reaches a predetermined value, said logic means including means for connecting said clock pulse means and said first and second multiposition registers to said plurality of second pulse counters so that each of said second pulse counters counts clock pulses during its associated program sector, said multiposition control register means including positions associated with the different program sectors, and said connecting means includes means for connecting the outputs of each of said second pulse counters to the position of said multiposition control register means associated with the same program sectors.

3. The apparatus of claim 1 further comprising means responsive to a signal from the central processing unit to inhibit the transfer of clock pulses to all of said counters.

* * * * *